United States Patent
Lunn et al.

(10) Patent No.: US 9,591,711 B2
(45) Date of Patent: *Mar. 7, 2017

(54) METHOD AND SYSTEM FOR ILLUMINATION MANAGEMENT

(71) Applicant: Cooper Technologies Company, Houston, TX (US)

(72) Inventors: Michael Alan Lunn, Peachtree City, GA (US); Brian Eugene Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,151

(22) Filed: Dec. 11, 2015

(65) Prior Publication Data
US 2016/0174323 A1   Jun. 16, 2016

Related U.S. Application Data

(63) Continuation of application No. 14/283,898, filed on May 21, 2014, now Pat. No. 9,215,775.

(51) Int. Cl.
*H05B 33/08* (2006.01)
*H05B 37/02* (2006.01)
*H05B 39/04* (2006.01)

(52) U.S. Cl.
CPC ..... *H05B 33/0854* (2013.01); *H05B 37/0218* (2013.01); *H05B 37/0227* (2013.01); *H05B 37/0272* (2013.01); *H05B 39/042* (2013.01); *Y02B 20/46* (2013.01)

(58) Field of Classification Search
CPC .......... H03K 33/0854; H03K 37/0218; H03K 37/0227; H03K 37/0272; H03K 39/042
USPC ......................................................... 315/151
See application file for complete search history.

(56) References Cited

U.S. PATENT DOCUMENTS

| | | | |
|---|---|---|---|
| 8,994,376 B2* | 3/2015 | Billeres | A61B 5/097 324/260 |
| 9,215,775 B1* | 12/2015 | Lunn | H05B 33/0854 |
| 2009/0267540 A1* | 10/2009 | Chemel | F21S 9/043 315/297 |
| 2010/0302515 A1* | 12/2010 | Plut | H04N 9/3155 353/85 |
| 2012/0206050 A1* | 8/2012 | Spero | B60Q 1/04 315/152 |

(Continued)

*Primary Examiner* — Dylan White
(74) *Attorney, Agent, or Firm* — King & Spalding LLP (57) ABSTRACT

A luminaire can comprise a system that automatically adjusts light output from the luminaire to control light level in an illuminated area. The system can increase light output if the light level in the area falls below a target light level or decrease light output if the light level in the area rises above the target. For example, when the area is illuminated by a combination of sunlight and luminaire light, the light level can be maintained at the target level by gradually decreasing light output as the sunlight contribution increases in the morning and by gradually increasing light output as the sunlight contribution decreases in the evening. The system adjustments can take into consideration whether the light level is offset from the target due to a change in the target or a short-term fluctuation that may be due to a cloud temporarily blocking the sun.

19 Claims, 11 Drawing Sheets

(56) References Cited

U.S. PATENT DOCUMENTS

| | | | | |
|---|---|---|---|---|
| 2012/0249013 A1* | 10/2012 | Valois | ............... | H05B 37/0227 |
| | | | | 315/291 |
| 2013/0293113 A1* | 11/2013 | Morrow | ................ | H05B 37/02 |
| | | | | 315/149 |
| 2013/0320862 A1* | 12/2013 | Campbell | .............. | H05B 37/02 |
| | | | | 315/152 |
| 2016/0286627 A1* | 9/2016 | Chen | .................. | H05B 37/0245 |
| 2016/0286629 A1* | 9/2016 | Chen | .................. | H05B 37/0272 |

\* cited by examiner

METHOD AND SYSTEM FOR ILLUMINATION MANAGEMENT

RELATED APPLICATIONS

The present application is a continuation application of and claims priority under 35 U.S.C. §120 to U.S. patent application Ser. No. 14/283,898, filed May 21, 2014, and titled "Method and System for Illumination Management." The entire content of the foregoing application is hereby incorporated by reference herein.

TECHNICAL FIELD

Embodiments of the technology relate generally to illumination management for one or more luminaires, and more particularly to controlling a luminaire to provide illumination that is flexible from a user standpoint and robust from the standpoint of providing an area with a consistent level of lighting and compensating for environmental fluctuations.

BACKGROUND

With many conventional illumination systems, a user simply flips a switch to turn a light on or off. Other illumination systems have an associated dimming switch for a user to increase or decrease light output manually. Still other illumination systems turn on when a sensor detects presence of a person.

However in many situations, facilities and people need a greater level of light management and control. A capability addressing such a need, or other related deficiencies in the art, would improve lighting, including from economic, usability, and energy perspectives.

SUMMARY

In one aspect of the disclosure, a luminaire can comprise a light management system. The light management system can comprise a feedback loop that comprises a light sensor. The light management system can automatically adjust light output of the luminaire to control light level in an illuminated area. The light management system can increase the amount of light output from the luminaire if the light level in the area falls below a target light level. The light management system can likewise decrease the amount of light output from the luminaire when the light level in the area rises above the target. For example, when the area is illuminated by a combination of sunlight and luminaire light, the light management system can maintain the light level in the area at a target by compensating for daily changes in the sunlight level. As the sunlight contribution gradually increases in the morning, the amount of light output from the luminaire can be gradually decreased. As the sunlight contribution gradually decreases in the evening, the amount of light output from the luminaire can be gradually increased.

The light management system's adjustments to light output can take into consideration various modes, conditions, and user inputs. For example, the adjustments can be relatively aggressive or implemented promptly if a difference between the target and the light level in the area is due to a user changing the target. As another example, the aggressiveness or response speed of the adjustments can depend upon the mode that a user has entered into the luminaire. As another example, light output adjustments can be less aggressive or delayed in order to avoid responding to short-term light fluctuations, such as a fluctuation caused by a small cloud passing in front of the sun and blocking sunlight for a short period of time.

The foregoing discussion of lighting is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will be made below to the accompanying drawings.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

A light management system can control one or more luminaires in a manner that may be robust and/or flexible. In some embodiments, the light management system can comprise a computer-based feedback system that can make control decisions based on luminaire mode, user entries, offset between a target and a monitored value, offset duration, whether changes are short term verses long term, sensor input, and/or other appropriate information.

In some example embodiments, an occupancy sensor is small enough to be embedded directly into a luminaire and may be configurable. When motion is detected, the occupancy sensor can indicate that an area is occupied. After not detecting motion within a preset time delay, the occupancy sensor can indicate that the area is unoccupied.

In some example embodiments, such an occupancy sensor is part of a light management system that is approximately 0.75 inches by 0.75 inches or less. In some example embodiments, the light management system can monitor occupancy, temperature, and light level to control a dimmable luminaire.

In some example embodiments, an owner or an installer may use a handheld remote control or smartphone with a custom application to configure the light management system. The user may communicate with the light management system utilizing an infrared communication interface that is built in or plugged into the smart phone or via a cellular network.

In some example embodiments, the light management system may be connected to a networked or Wi-Fi interface. In some embodiments, the light management system may communicate via a universal asynchronous receiver/transmitter (UART) interface to a variety of power modules that can include other network interfaces, such as digital addressable lighting interface (DALI) or Wi-Fi, as well as direct control of line voltage switching and light-level control.

In some example embodiments of the light management system, light-level control can be used to provide a closed-loop daylight harvesting system. A constant level of light can be maintained despite variation in the contribution of outside light or other light sources.

In some example embodiments of the light management system, a preset light level or scene can be maintained within limits of a dimmable light source. Thus, if an outside contribution of light is high, the light source can be driven to its lowest light output, which might still be higher than a preset level. Conversely, the outside light contribution might be very low and drive the light source to its highest output, which can be lower than a preset level.

In some example embodiments, the light management system can store and manage to one or more predefined scenes and one or more manually set scenes. The term "scene," as used herein, generally refers to a scenario, situation, setting, mode, or configuration.

In one example embodiment, the light management system stores and manages to seven scenes, such as: daytime occupied; daytime unoccupied; twilight occupied; twilight unoccupied; night occupied; night unoccupied; and energy saver.

In some example embodiments, when the occupancy sensor indicates that an area is vacant, the light management system monitors light level to determine if ambient light level is below a twilight threshold. The twilight threshold could be about 100 lux, for example. A sensed light level greater than the twilight threshold may be considered daytime. If the sensed light level is below that threshold, the light management system can automatically invoke and utilize the twilight unoccupied scene settings.

As another example, if the ambient light level is below a nighttime threshold, then the light management system can automatically invoke the occupied or unoccupied night scene setting (according to whether the occupancy sensing). The night threshold could be about 50 lux, for example.

Either the handheld remote or the smart phone app can be used to adjust the preset scene levels. Additionally, a user may define the resulting levels as a permanent scene.

In some example embodiments, if a manually set light level is not locked into one of the scenes, the light management system automatically reverts to a preset scene the next time the area becomes unoccupied. In some example embodiments, the handheld remote can be used to adjust the internal time delay duration.

In some example embodiments of the light management system, the energy saver scene is automatically applied if the light management system does not detect motion for a predetermined period of time, for example ten minutes, regardless of the preset time delay duration. Thus, if the preset time delay is longer than ten minutes (for example fifteen minutes) and the occupancy sensor does not detect motion for ten minutes, the scene automatically changes to the energy saver scene. Then, if the occupancy sensor does not detect motion for the following five minutes, the scene changes to the appropriate unoccupied setting.

Although the time period (ten minutes in the above example) could be a fixed amount of time, it could be a fraction of a normal delay period, such as one-half of a normal delay period. For example, if the time delay is set at fifteen minutes, the energy saver scene could become active after no motion is detected for seven and one-half minutes. In some embodiments, this function is available only in daylight mode. In example embodiments, the energy saver scene level is lower than the occupied setting and higher than the unoccupied setting. In some embodiments, multiple energy saver scenes are implemented (e.g. daytime, twilight, and night).

Figure 2:
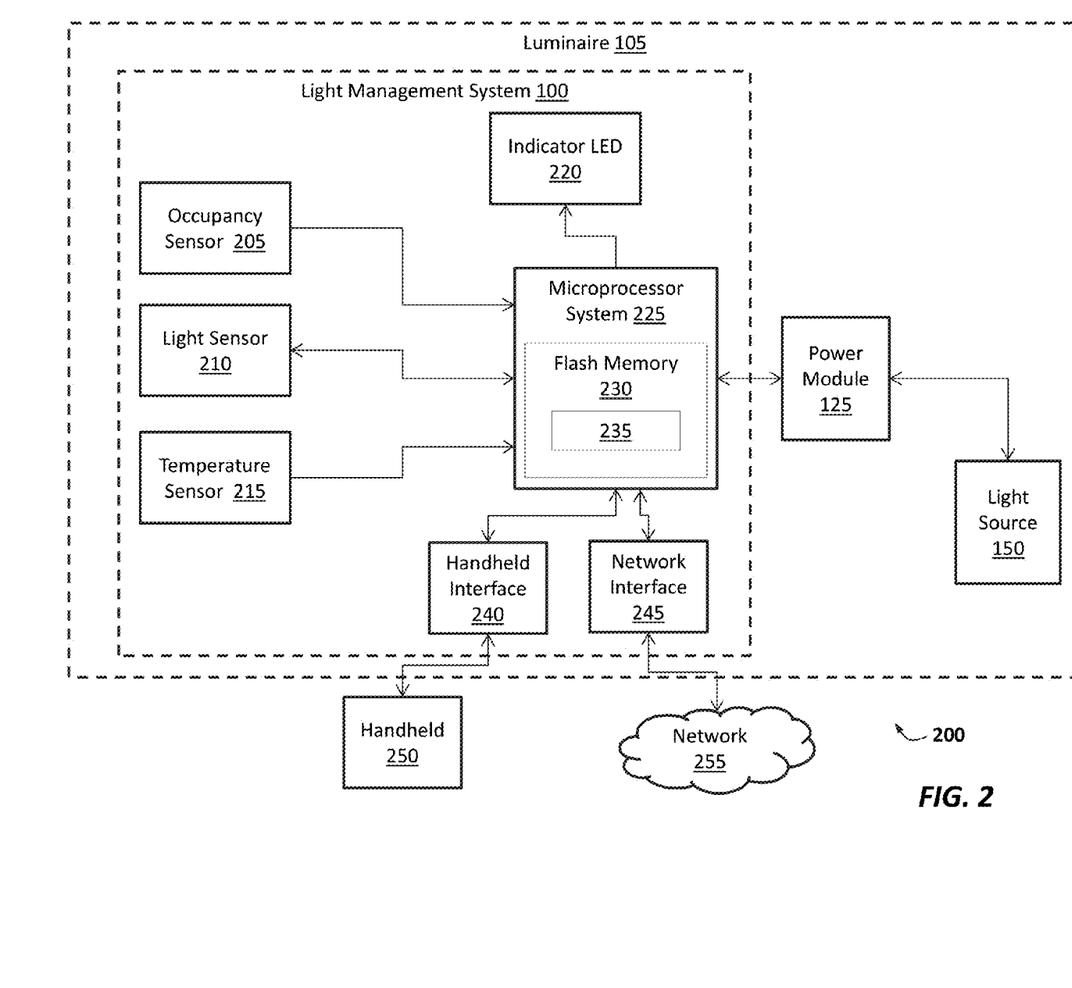
FIG. 2 is a functional block diagram of a system that includes a luminaire comprising a light management system in accordance with some example embodiments.
Figure 3:
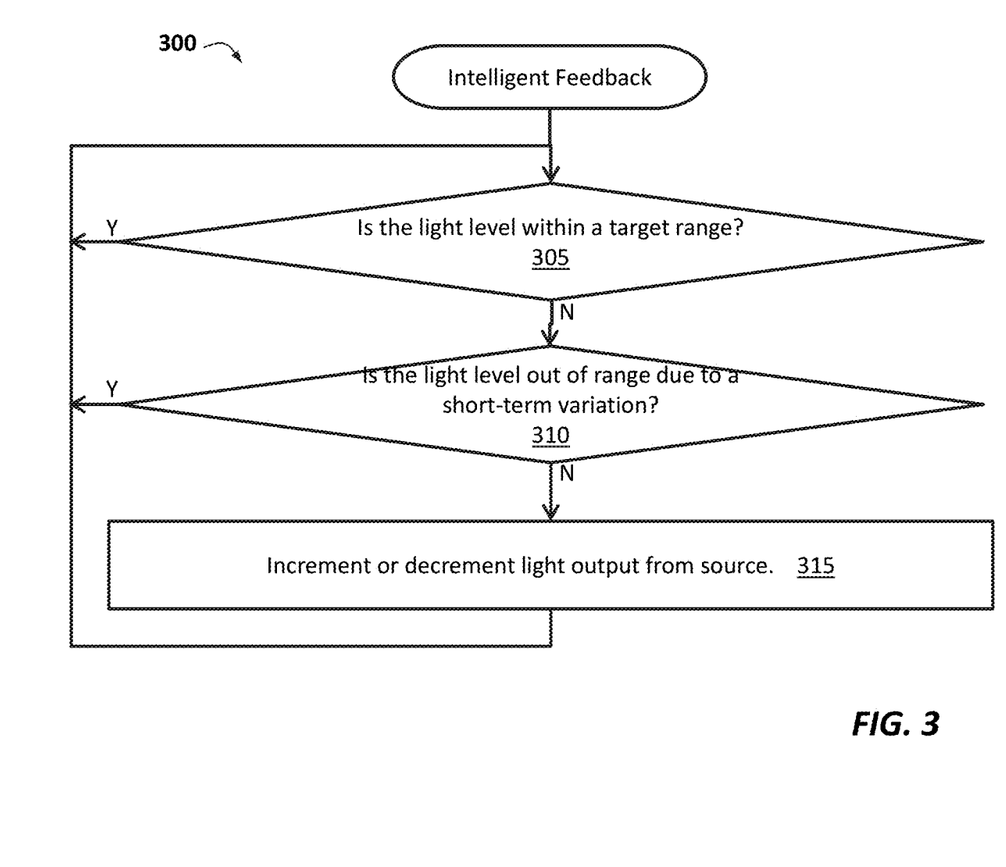
FIG. 3 is a flowchart of a process for controlling a luminaire in accordance with some example embodiments.
Figure 4A:
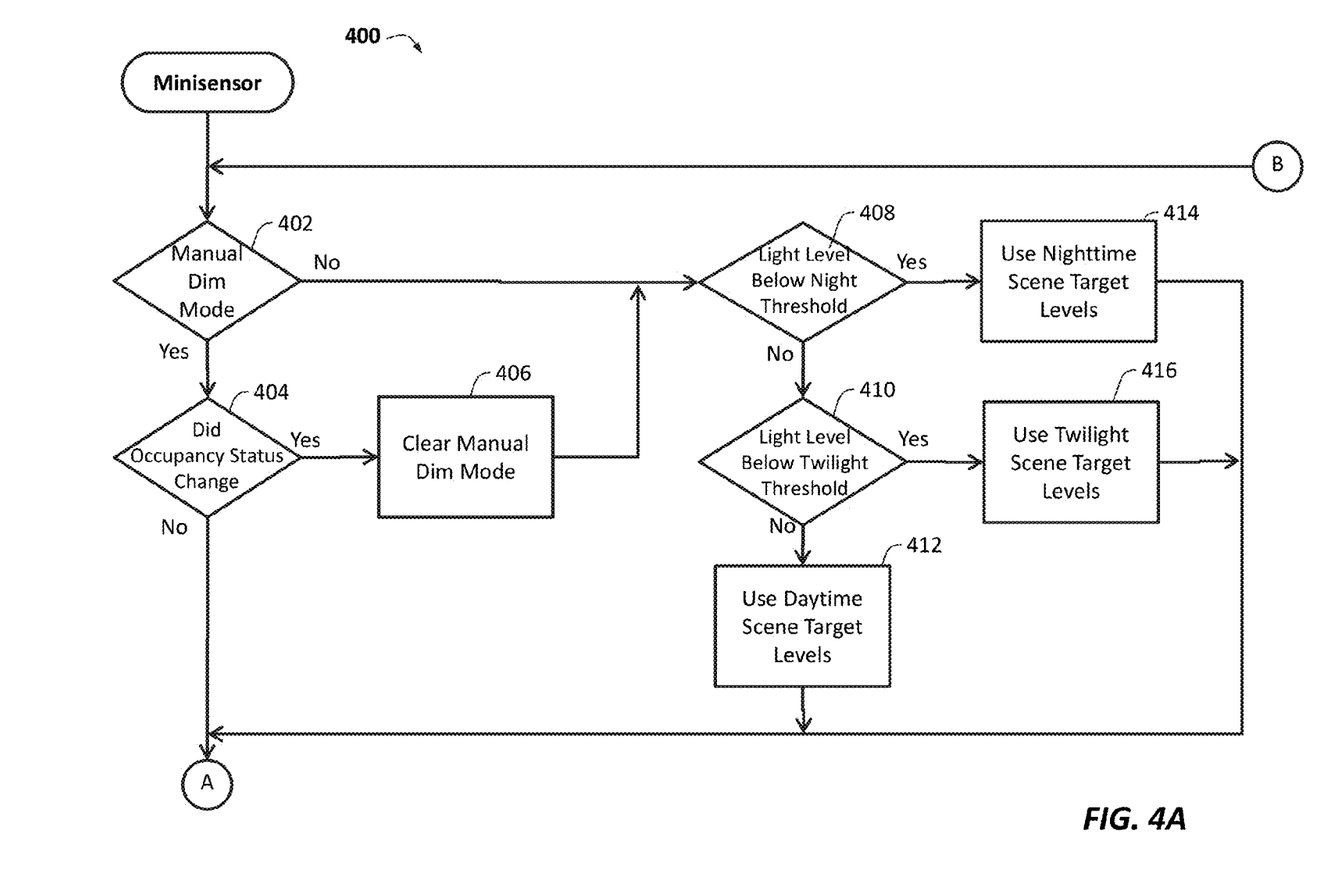
FIGS. 4A, 4B, 4C, 4D, 4E, and 4F (collectively FIG. 4) is a flowchart of a process for luminaire management in accordance with some example embodiments.
Figure 5:
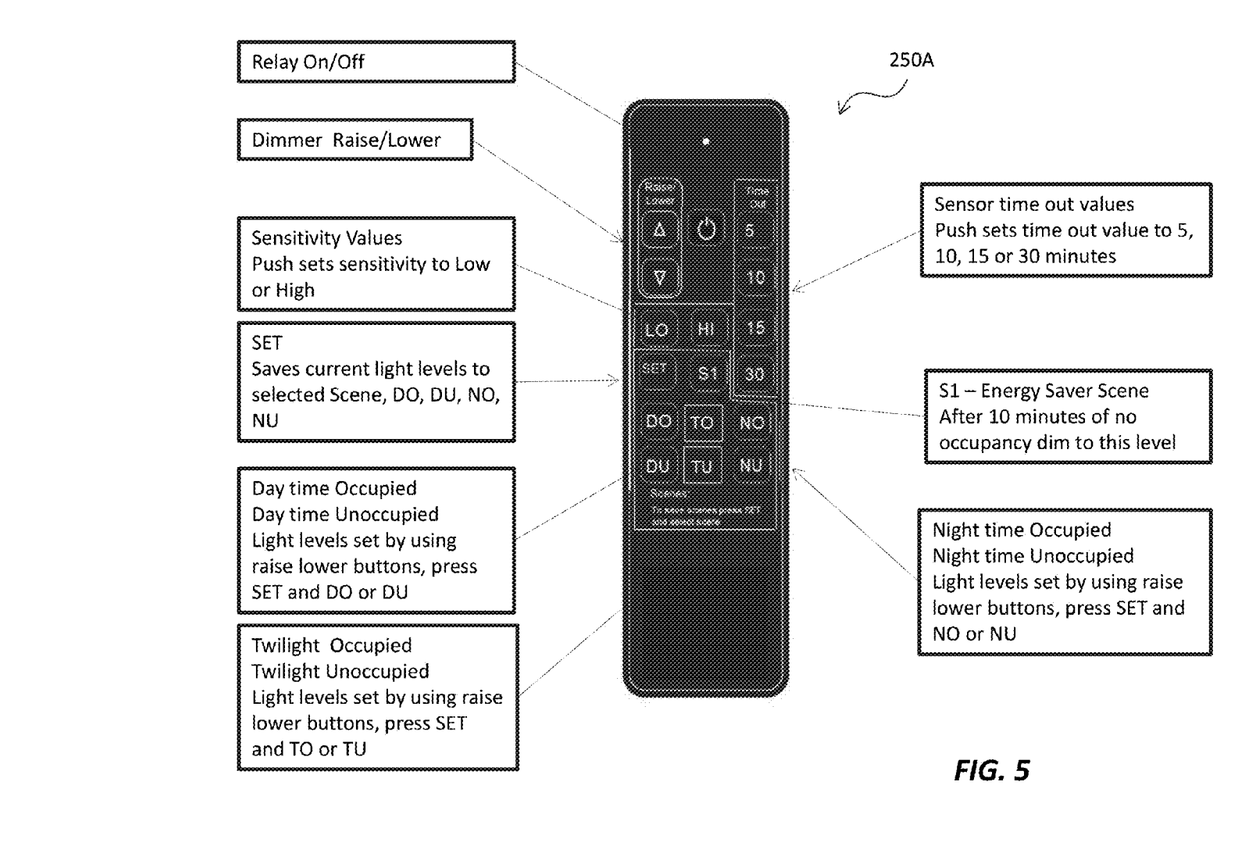
FIG. 5 is an illustration of a handheld device that provides a user interface for managing a luminaire in accordance with some example embodiments.
Figures 6A, 6B:
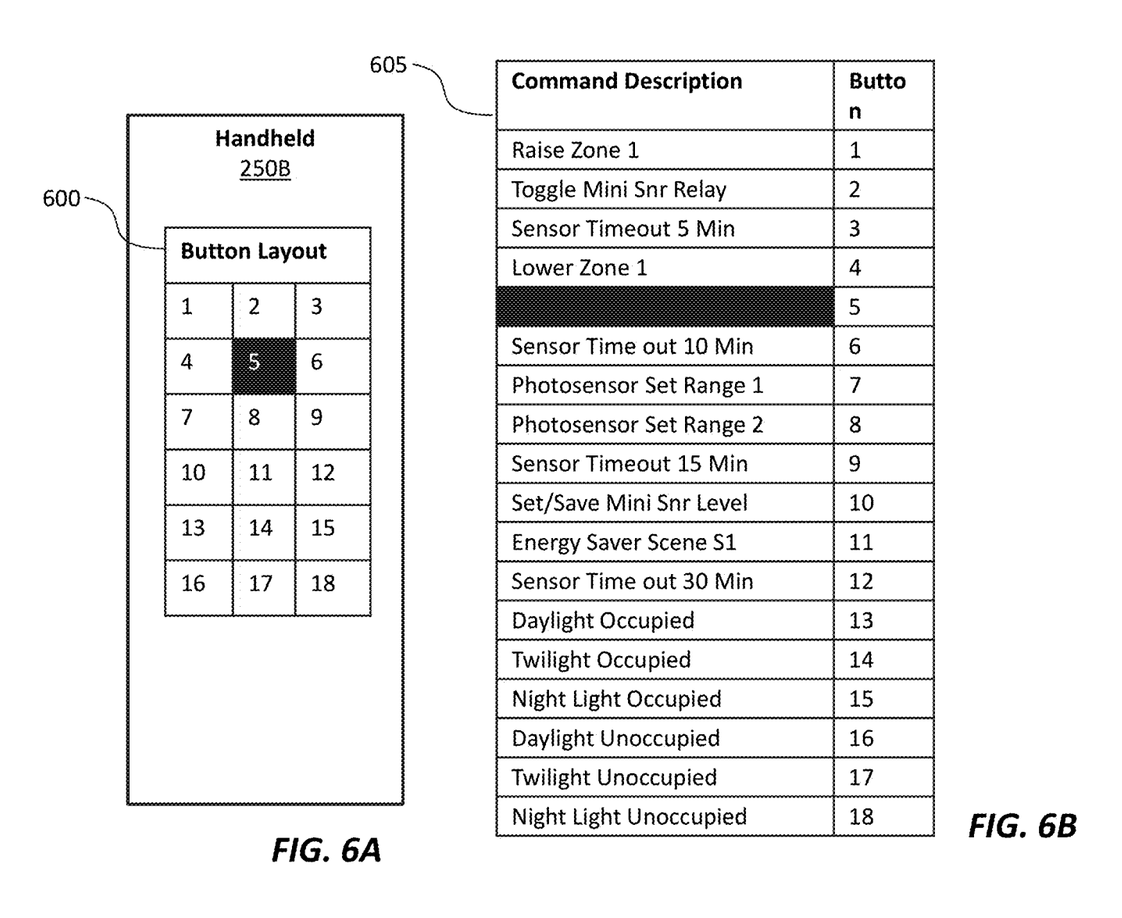
FIGS. 6A and 6B (collectively FIG. 6) is an illustration of a handheld device and an associated command table providing a user interface for managing a luminaire in accordance with some example embodiments.

Some representative embodiments will be described more fully hereinafter with example reference to the accompanying drawings. In the drawings, FIG. 1 describes a representative installation. FIG. 2 describes a representative light management system. FIGS. 3 and 4 describe representative light management processes that may be executed on the light management system. FIGS. 5 and 6 describe representative handheld user interfaces.

The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 1:
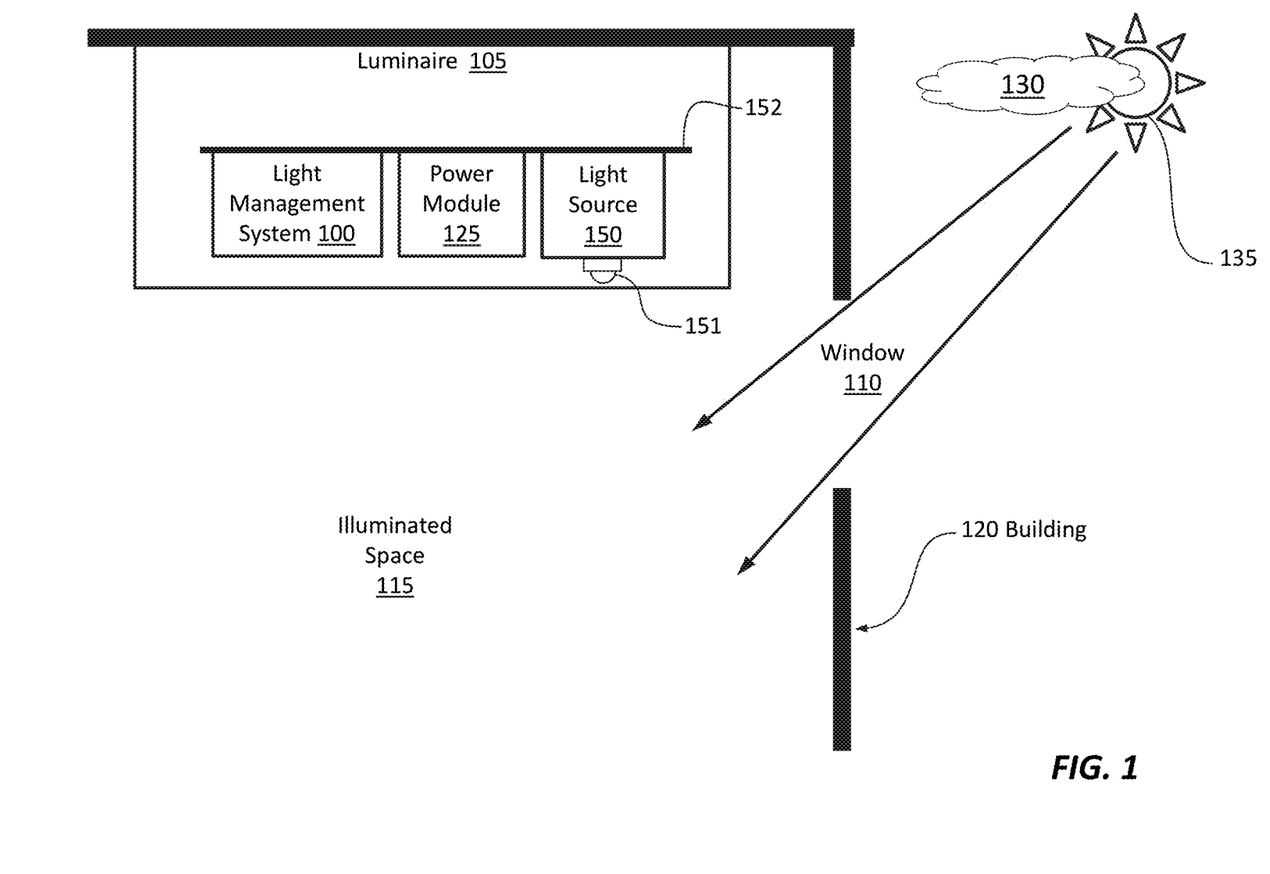
FIG. 1 is an illustration of a building in which a luminaire that comprises a light management system is installed in accordance with some example embodiments.

Turning now to FIG. 1, this figure illustrates a building 120 in which an example luminaire 105 that comprises an example light management system 100 is installed according to some embodiments. The building 120 illuminates a space 115, which may comprise a room, lobby, or other area in the illustrated embodiment, but may also comprise an outdoor area. Thus in some embodiments, the luminaire 105 may comprise an outdoor lighting fixture.

As illustrated, the space 115 receives light from the luminaire 105 as well as from the sun 135 through a window 110. Thus, the space 115 is illuminated by a combination of artificial lighting and sunlight. As will be discussed in further detail below, when a cloud 130 blocks the sun 135, the light management system 100 can compensate by increasing the output of light from the luminaire 105 or may wait and see if the cloud 130 passes before making any light output adjustments.

In addition to the light management system 100, the illustrated example luminaire 105 comprises a power module 125 and a light source 150 that are mounted to a frame 152 of the luminaire 105. The illustrated light source 150 comprises a light emitting diode (LED) 151 that may be a chip-on-board (COB) light emitting diode or an array of discrete light emitting diodes. Various other embodiments may comprise light sources based on incandescent, high-energy discharge (HID), fluorescent, or some other appropriate technology.

Turning now to FIG. 2, this figure illustrates a functional block diagram of a system 200 that comprises the example luminaire 105 and associated light management system 100 according to some embodiments. The system 200 may be deployed in the example environment illustrated in FIG. 1 and discussed above, and will be described below in that example context.

In the illustrated embodiment, the light management system 100 comprises multiple sensors; however, other embodiments may comprise few or more sensors. The illustrated sensors include an occupancy sensor 205, a light sensor 210, and a temperature sensor 215.

The occupancy sensor 205 provides the light management system with occupancy information. The occupancy sensor 205 can sense whether the space 115 is occupied, for example. In some example embodiments, the occupancy sensor 205 may comprise a pyro-electric detector or other occupancy sensing technology that may pickup motion or human presence.

The light sensor 210 provides the light management system 100 with light level information. The light sensor 210 senses light level in the space 115, which may be due to light from the luminaire 105, other luminaires (not illustrated), and/or the sun 135, for example.

The temperature sensor 215 provides the light management system 100 with temperature information. In some embodiments, the temperature sensor 215 monitors temperature of the luminaire 105. In some embodiments, the temperature sensor 215 monitors temperature of the light sensor 210. In some embodiments, the temperature sensor 215 monitors temperature of the occupancy sensor 210. In some embodiments, the temperature sensor 215 monitors temperature of the space 115.

In the illustrated example embodiment, the light management system 100 comprises a microprocessor system 225 that receives signals conveying sensory information from the occupancy sensor 205, the light sensor 210, and the temperature sensor 215. The microprocessor system 225 can utilize temperature information from the temperature sensor 215 to adjust, or to interpret information received from, the occupancy sensor 205 and/or the light sensor 210.

The microprocessor system 225 may further automatically set gain on the light sensor 210 to increase dynamic range. For example, when the light level of the space 115 approaches an edge of a sensing range of the light sensor 210, the microprocessor system 225 can change the gain of the light sensor 210, effectively adjusting the sensing range or continuously refining light sensor resolution.

The microprocessor system 225 comprises flash memory 230 in which one or more programs 235 are stored. The microprocessor system 225 can execute the programs 235 to implement the various processes described herein. The microprocessor system 225 can comprise or utilize volatile and nonvolatile memory, for example.

The light management system 100 controls the light source 150 via the power module 125. In an example embodiment, the light management system 100 sends lighting adjustment commands to the power module 125, and the power module 125 acts on those commands by adjusting the power supplied to the light source 150. For example, the light management signal 125 can provide a voltage signal that has a magnitude corresponding to a desired light output. The power module 125 can receive that signal and drive the light emitting diode 151 of the light source 150 with a corresponding amount of current that will cause the light source 150 to emit the desired light output.

In the illustrated embodiment, the light management system 100 comprises an indicator light emitting diode 220. Via the indicator light emitting diode 220, a user or other person (or a machine) can obtain status information or receive other messages produced by the microprocessor system 225.

As illustrated, the light management system 100 comprises a handheld interface 240 to a handheld device 250 that provides a user interface and further comprises a network interface 245 that provides an interface to a network 255. In some embodiments, the handheld device 250 comprises a smartphone or other cellular device running an application that provides a user interface. In some example embodiments, the handheld device 250 comprises a remote control similar to what consumers commonly utilize to control a television.

In some embodiments, the network 255 comprises a local area network (LAN) or other data network. In an office or similar application, the light management system 100 can provide computer users with a Wi-Fi link onto a corporate network, an intranet, or the Internet, for example.

In some example embodiments, the network 255 comprises a facility-wide energy management system and/or a facility-wide lighting management system. Accordingly, the network 255 can collect usage and/or consumption information and control a network of luminaires 105 distributed across a building, campus, or other facility or property.

Representative processes will now be discussed in further detail with reference to FIGS. 3 and 4. Certain steps in the processes described below may need to naturally precede others to achieve intended functionality. However, the technology is not limited to the order of the steps described to the extent that such reordering or re-sequencing does not render the process useless or nonsensical. Thus, it is recognized that some steps may be performed before or after other steps or in parallel with other steps without departing from the scope and spirit of this disclosure.

Turning now to FIG. 3, this figure illustrates a flowchart of an example process 300 for controlling the luminaire 105 according to some embodiments. The process 300, named "Intelligent Feedback" without implying any limitations, can be executed by the microprocessor system 225 as part of the programs 235 to control the output of the luminaire 105 to achieve a desired level of illumination in the space 115.

At inquiry block 305 of process 300, the light sensor 210 monitors light level in the space 115 and sends a signal to the microprocessor system 225. The microprocessor system 225 compares the monitored light level with a target range, which may be entered via the handheld device 250 and stored in the flash memory 230 or some other volatile or nonvolatile memory. If inquiry block 305 results in a determination that the monitored light level in the space 115 is within the target range, then process 300 iterates and continues to monitor for incursions outside the target range.

If inquiry block 305 determines that the light level is outside the target range (for example below or above the range), then process 300 executes block 310. At block 310, the microprocessor system 225 makes a determination about whether the deviation from the target range is a short-term deviation or a long-term deviation.

In some embodiments, the microprocessor system 225 makes the determination by waiting to see if the deviation is sustained for a predetermined amount of time. For example, the microprocessor 225 may clock the amount of time that the deviation is sustained. If the deviation continues for a threshold amount of time, the microprocessor may deem that the light level is out of range due to a long-term variation.

In this manner, the microprocessor may filter out short-term light reductions due, for example, to a bird or cloud 130 blocking the sun 135 for a short period of time and short-term increases due, for example to someone operating a flash camera or a passing car projecting headlight beams into the space 115.

The period of time may be selected via the handheld device 250 according to environment conditions and/or personal preference. (However, in some embodiments, a period of time that is configurable with the handheld device 250 is for occupancy delay rather than, or in addition to, daylight integration time.) In some example embodiments, the period of time is greater than one second. In some example embodiments, the period of time is less than five minutes. In some example embodiments, the period of time is between one second and five minutes. Various other values may be utilized in accordance with application parameters.

In some embodiments, a last-ramp' mode is provided such that after a state change, the dim level can change a certain percentage over a certain time period, for example 1% every ⅛ second if not within a threshold, so that a new target can be found quickly. When not in fast-ramp mode the dim level can change at another rate, for example 1% every 4 seconds.

In some embodiments, the microprocessor system 225 makes the determination based on whether a user has changed the target light level. For example, if someone enters a request for more light via the handheld device 250, then the microprocessor system 225 may immediately deem the variation as long-term. In some embodiments, the manual setting does not change the integration rate, but provides an ability to set a custom light level that will last until the next state change. Such a state change could comprise transitioning from occupied to unoccupied.

In some embodiments, the microprocessor system 225 implements the inquiry of block 310 using a combination of such timing and setpoint change analyses.

If the microprocessor system 225 determines at block 310 that the deviation is due to a short-term variation, then process 300 branches back to block 305 and iterates. Thus, the light management system 100 can maintain a steady output from the light source 150 as light level in the space 115 undergoes short-term fluctuations.

If execution of inquiry block 310 results in a determination that the variation is long term rather than short term, then process 300 executes block 315. At block 315, the microprocessor system 225 adjusts the output of the light source 150 towards bringing the light level in the illuminated space 115 into the desired range. For example, if the light level is below the target range, then the light management system 100 can increase light output, incrementally or otherwise. As another example, if the light level is above the target range, then the light management system 100 can decrease light output, incrementally or otherwise.

Following execution of block 315, process 300 can loop back to block 305 and iterate, thereby continuing to analyze and adjust luminaire light output to achieve desired lighting in the space 115.

Turning now to FIG. 4, this figure illustrates a flowchart of an example process 400 for luminaire management according to some embodiments. Similar to process 300, the programs 235 stored in the flash memory 230 can comprise instructions for execution of process 400, which is entitled "Minisensor" without implying any limitations.

At inquiry block 402 of process 400, the light management system 100 determines whether the luminaire 105 has been placed in manual dim mode, for example by a user or service professional using the handheld device 250.

If the determination of block 402 is positive, then the light management system 100 determines at block 404 whether the occupancy state has changed based on input from the occupancy sensor 205.

If the determination of block 404 is positive, then process 400 branches to block 406. At block 406, the light management system 100 clears the manual dim mode. In some embodiments, the fast-ramp mode may also be set here.

Process 400 proceeds to execute inquiry block 408 from block 406 and also from a no determination at inquiry block 402. At inquiry block 408, the light management system 100 determines if the light sensor 210 senses that the light level is below the night threshold. If the sensed light level is below the night threshold, then process 400 branches to block 414 and the light management system 100 uses nighttime scene target levels.

If the sensed light level is not below the night threshold, then process 400 branches to inquiry block 410, at which the light management system 100 determines if the sensed light level is below the twilight threshold.

If the light management system 100 determines that the sensed light level is below the twilight threshold, then process 400 executes block 416. At block 416, the light management system 100 uses the twilight scene target levels.

If, on the other hand, the light management system 100 determines that the sensed light level is not below the twilight threshold, then process 400 branches from block 410 to block 412. At block 412, the light management system 100 uses the daytime scene target levels.

Figure 4B:
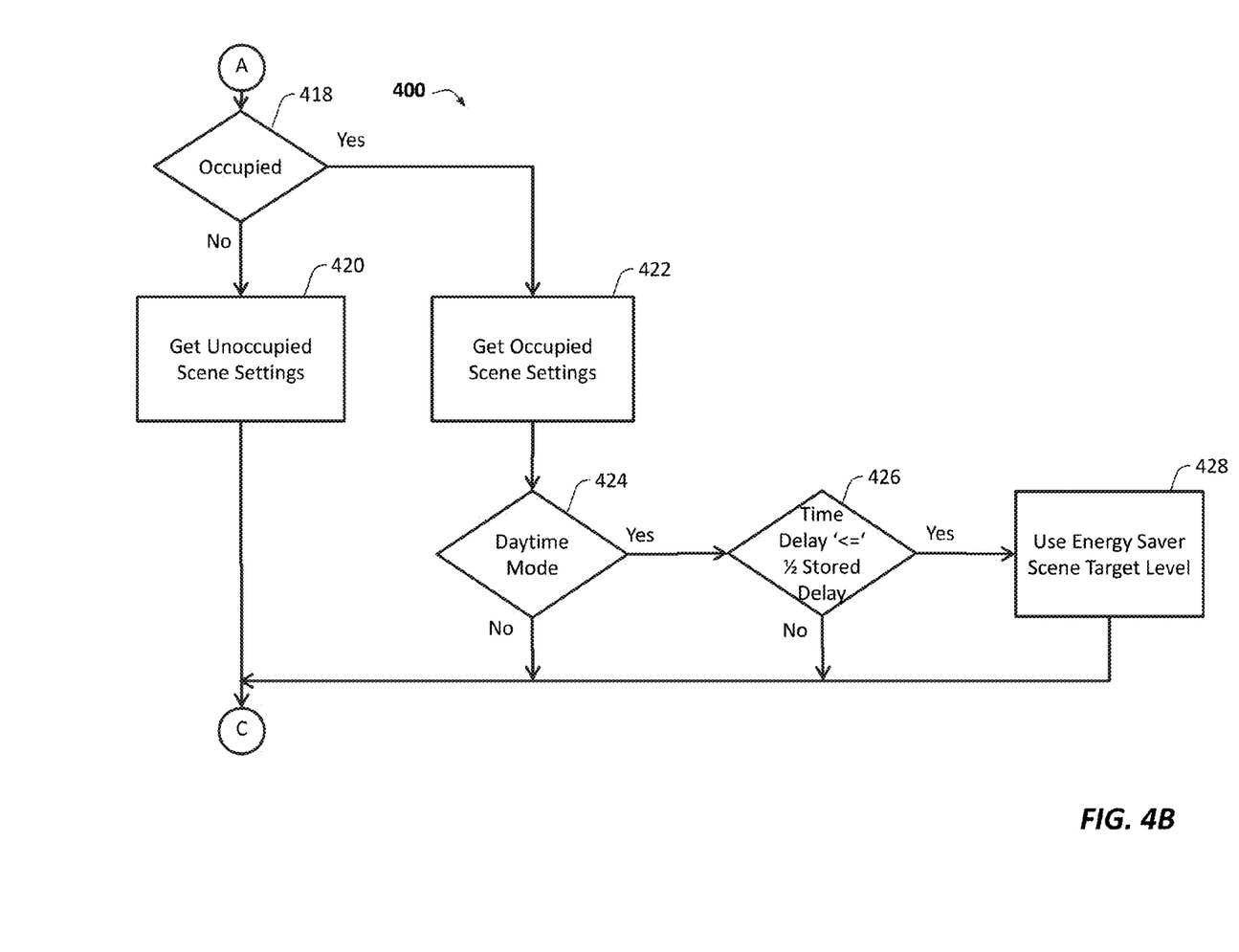

Following execution of block 412, 414, or 416 or a negative determination at block 404, process 400 executes inquiry block 418, which is illustrated in flowchart form on FIG. 4B. At block 418, the light management system 100 determines whether the space 115 is occupied based on signals received from the occupancy sensor 205.

If the light management system 100 determines that the space 115 is not occupied, then block 420 executes. At block 420, the light management system 100 implements unoccupied scene settings.

If, on the other hand, the light management system 100 determines that the space is occupied at inquiry block 418, then block 422 executes. At block 422, the light management system 100 implements occupied scene settings.

Inquiry block 424 executes following block 422. At inquiry block 424, the light management system 100 determines whether the luminaire 105 is in daytime mode. If the luminaire 105 is in daytime mode, then process 400 branches to inquiry block 426.

At inquiry block 426, the light management system 100 determines whether the time delay is less than or equal to a fraction of the stored delay, specifically one-half of the stored delay in the illustrated example flowchart. For example, if a user has set a ten-minute time delay, then inquiry block will utilize five minutes as a decision threshold.

If inquiry block 426 returns a positive determination, then at block 428 the light management system 100 utilizes the energy saver scene target level, which can be between the occupied and unoccupied light levels.

Figure 4C:
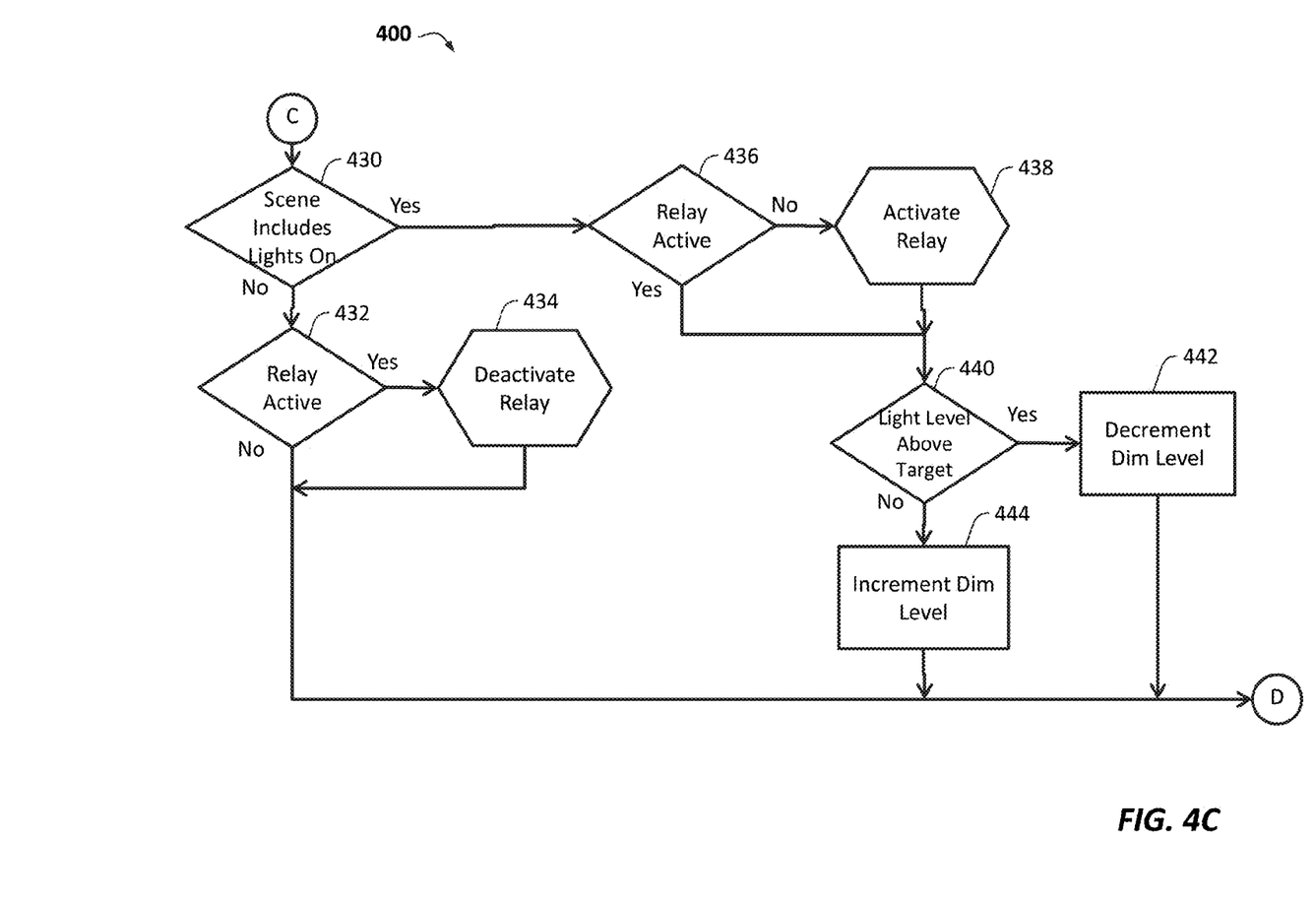

From execution of block 420 or block 428 or from a negative determination at block 424 or block 426, process 400 executes inquiry block 430, which is illustrated in example flowchart form on FIG. 4C.

At inquiry block 430, the light management system 100 determines whether the currently active scene includes lights on. If the determination is negative, inquiry block 432 executes to determine whether a relay for powering the luminaire 105 is active. If the relay is active, the relay is deactivated at block 434.

If inquiry block 430 results in a positive determination, then the illumination management system 100 determines at inquiry block 436 whether the relay is active. A negative determination at block 436 results in activation of the relay at block 438.

Following activation of the relay at block 438 or a positive determination at block 436, inquiry block 440 executes. At block 440, the light management system 100 determines whether the sensed light level is above target. If the light level is above target, then the light management system 100 dims the light source 150 at block 442. If, on the other hand, the light level is below target, the light management system increases the light output of the light source 150 at block 444.

Figure 4D:
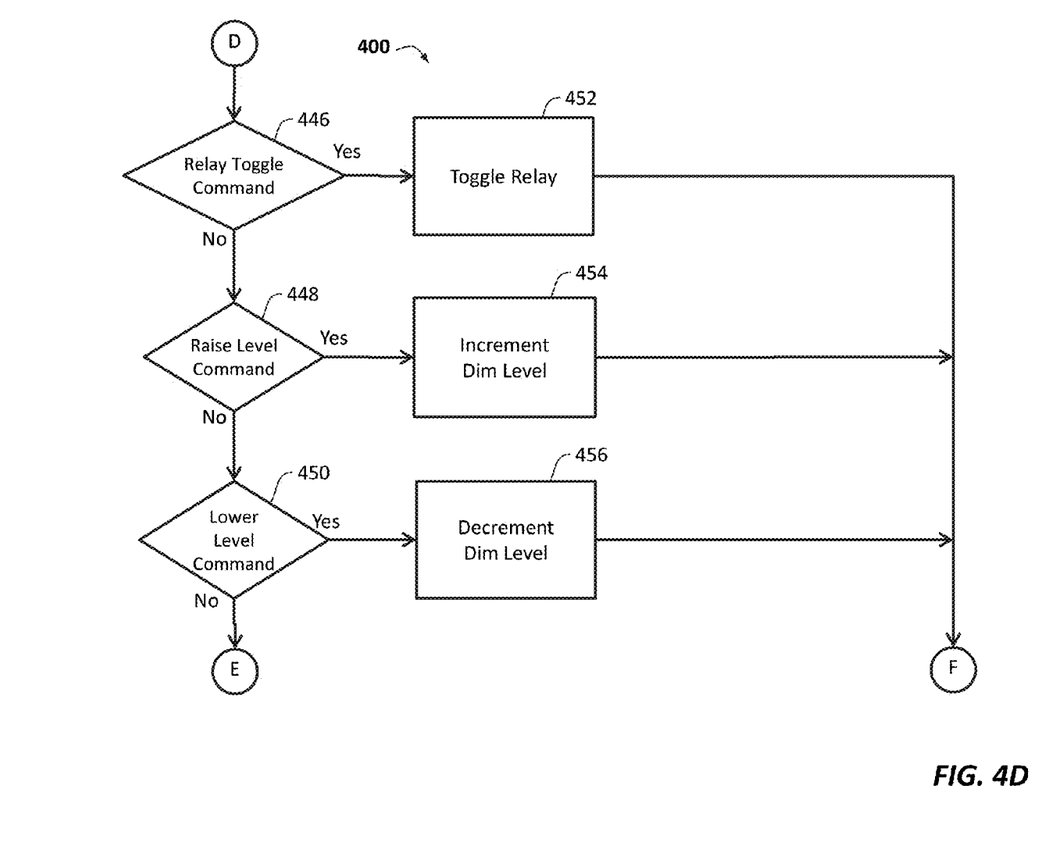

Following a negative determination at block 432, or execution of block 434, 444, or 442, process 400 executes inquiry block 446, which is illustrated in flowchart form on FIG. 4D. At inquiry block 446, the light management system 100 determines whether the relay toggle command is active. These commands may be entered from the handheld device 250, which may comprise a smartphone application, a remote control, or a networked interface. If the relay command is active, then the relay is toggled at block 452.

If the relay command is not active, then the light management system 100 determines at inquiry block 448 whether the raise level command is active. If the determination is positive, then the light output is incrementally increased at block 454.

If the determination is negative, then inquiry block 450 determines whether the lower level command is active. If the lower level command is active, then the light output is incrementally decreased at block 456.

Figure 4E:
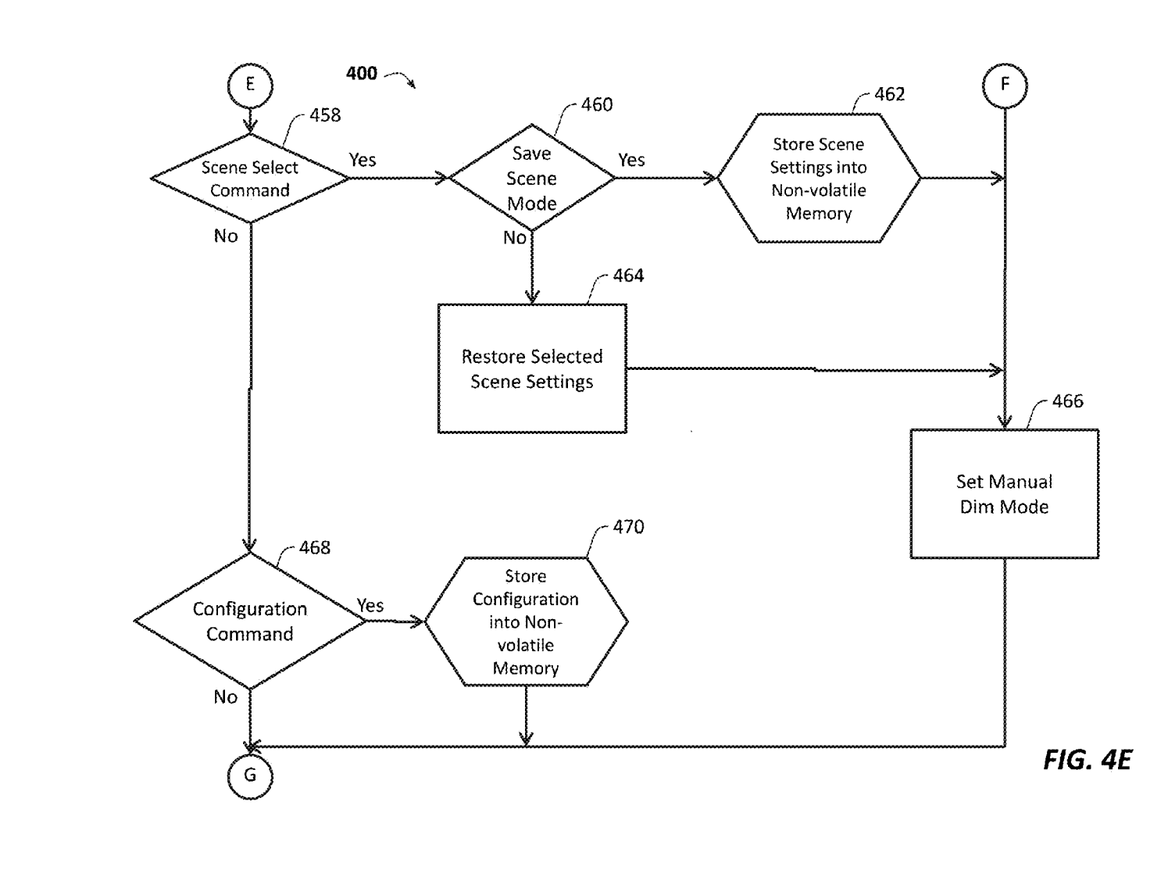

Process 400 flows from block 452, 454, or 456 to block 466, which is illustrated in flowchart form on FIG. 4E. At block 466, manual dim mode is set.

A negative determination at inquiry block 450 results in execution of inquiry block 458, which is illustrated in flowchart form on FIG. 4E. At block 458, the light management system 100 determines if a scene select command is active. If so, inquiry block 460 determines whether the save scene mode is active.

If the save scene mode is active, then scene settings are stored in nonvolatile memory at block 462, and block 466 executes and the manual dim mode is set. If the save scene mode is not active, then the selected scene settings are restored at block 464, and block 466 executes.

If inquiry block 458 returns a negative determination, then inquiry block 468 executes. At inquiry block 468 the light management system 100 determines whether the configuration command is active. If so, the configuration is stored in nonvolatile memory at block 470.

Figure 4F:
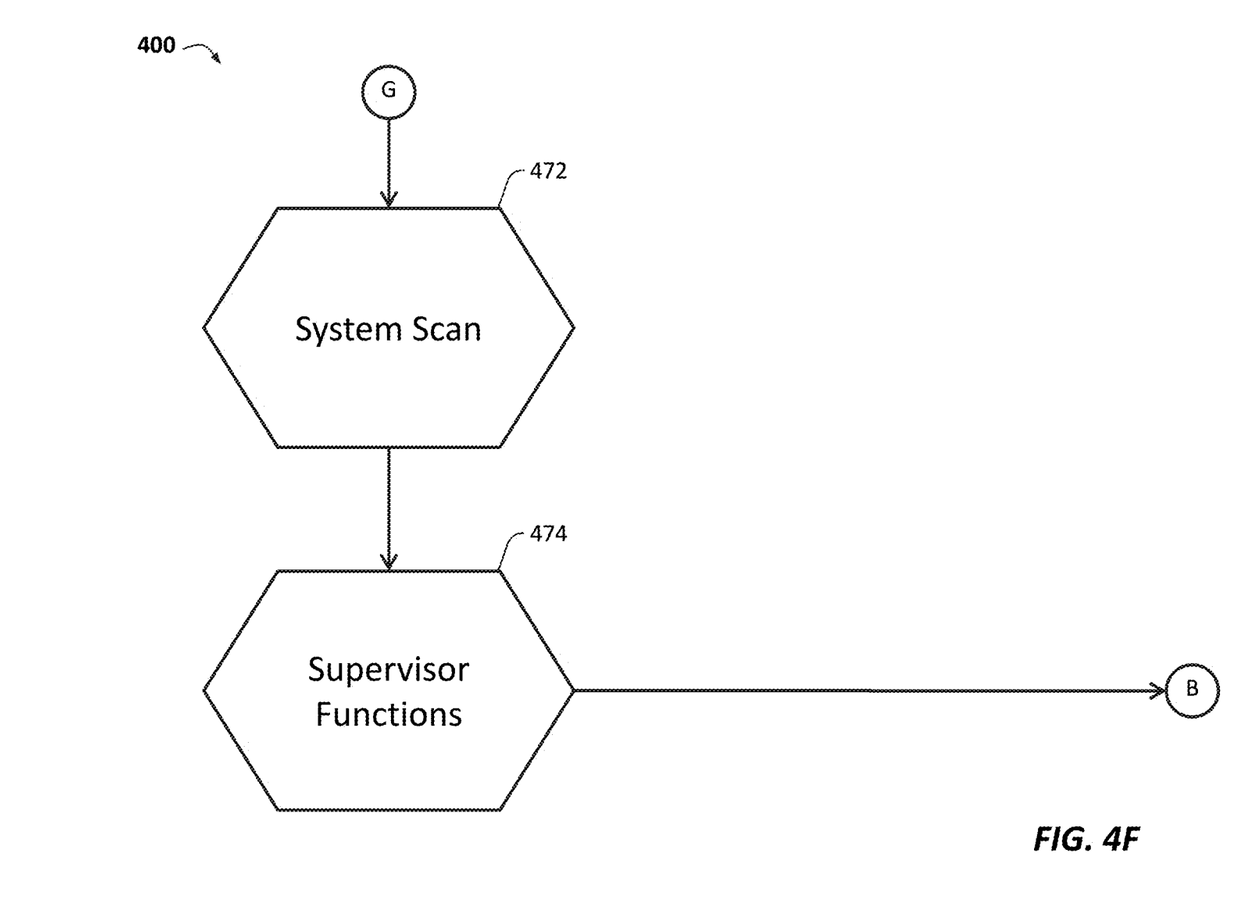

Following a negative determination at inquiry block 468 or execution of block 470 or 466, process 400 executes block 472, which is illustrated in flowchart form on FIG. 4F. At block 472, the light management system 100 performs a system scan, which can comprise scanning sensor inputs to update status of ambient light, occupancy and temperature. At block 474, the light management system 100 performs supervisor functions, which can comprise utilizing internal timers, watchdog functions, communications protocol, and LED outputs.

From block 474, process 400 loops back to block 402, which is illustrated in flowchart form on FIG. 4A, and iterates. Accordingly, the light management system 100 can intelligently manage the luminaire 105 to provide illumination that is flexible and robust.

Turning now to FIG. 5, this figure illustrates an example handheld device 250A that provides a user interface for managing the luminaire 105 according to some embodiments. The illustrated handheld device 250A is one example embodiment of the handheld device 250 illustrated in FIG. 2 and discussed above. The handheld device 250A can be viewed as a remote control with buttons configured for user entry of commands and scenes into the luminaire 105. Thus, the handheld device 250A of FIG. 5 provides an example user interface to the light management system 100.

Turning now to FIG. 6, this figure illustrates an example handheld device 250B and associated command table 605 providing a user interface for managing the luminaire 105 according to some embodiments. The illustrated handheld device 250B is another example embodiment of the handheld device 250 illustrated in FIG. 2 and discussed above. Accordingly, the handheld device 250B of FIG. 6 provides another example user interface to the light management system 100.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for managing a light source of a luminaire, the system comprising:
   a microprocessor system that comprises memory and that is connected to a light sensor that comprises a gain; and
   computer executable instructions stored in the memory for performing the steps of:
      monitoring light level based on input from the light sensor;
      changing the gain based on the monitored light level;
      identifying an offset in the monitored light level relative to a target light level;
      making a determination about an amount of time that the offset persists; and
      adjusting intensity of the light source according to the determination.

2. The system of claim 1, wherein the step of adjusting intensity comprises adjusting intensity based on whether the offset between the monitored light level and the target light level is due to a change in the target light level or due to a change in the monitored light level.

3. The system of claim 1, wherein adjusting intensity of the light source comprises compensating for a fluctuation in sunlight.

4. The system of claim 1, wherein the step of adjusting intensity of the light source according to the determination comprises:
   responsive to a first determination result, incrementally increasing the intensity of the light source;
   responsive to a second determination result, incrementally decreasing the intensity of the light source; and responsive to a third determination result, maintaining the intensity of the light source.

5. The system of claim 1, wherein the light source comprises at least one light emitting diode.

6. The system of claim 1, wherein the system comprises the light source, the light sensor, and the luminaire.

7. A system for managing a light source of a luminaire, the system comprising:
a microprocessor system that comprises memory and that is connected to a sensor; and
computer executable instructions stored in the memory for performing the steps of:
monitoring light level based on input from the sensor;
if the luminaire is in a mode and the monitored light level is beyond a threshold for an amount of time, then adjusting intensity of the light source; and
if the luminaire is in a different mode and the monitored light level is beyond the threshold, then adjusting intensity of the light source prior to passage of the amount of time.

8. The system of claim 7, wherein if the monitored light level is beyond the threshold comprises if the monitored light level is above the threshold.

9. The system of claim 7, wherein adjusting intensity of the light source comprises decreasing intensity of the light source.

10. The system of claim 7, wherein if the monitored light level is beyond the threshold comprises if the monitored light level is below the threshold.

11. The system of claim 7, wherein adjusting intensity of the light source comprises increasing intensity of the light source.

12. The system of claim 7, further comprising a temperature sensor connected to the microprocessor system.

13. The system of claim 7, further comprising an occupancy sensor connected to the microprocessor system.

14. The system of claim 7, wherein the threshold comprises a light intensity range.

15. The system of claim 7, wherein adjusting intensity of the light source comprises ramping intensity of the light source up or down according to whether the light level is above or below the threshold.

16. A system for managing a light source of a luminaire, the system comprising:
a microprocessor system that comprises memory and that is connected to a sensor; and
computer executable instructions stored in the memory for performing the steps of:
monitoring light level based on input from the sensor;
determining whether the monitored light level has undergone a short-term change or a long-term change; and
adjusting intensity of the light source based on the determination.

17. The system of claim 16, wherein adjusting the intensity of the light source based on the determination comprises adjusting the light source only if the light level is determined to have undergone the long-term change.

18. The system of claim 16, further comprising a wireless interface that is operably coupled to the microprocessor system and that is configured for communicating with a smartphone through which a user can configure the luminaire.

19. The system of claim 16, further comprising a network interface that is operably coupled to the microprocessor system and through which a facility-wide energy management system can control the luminaire.

* * * * *